Figure 1:
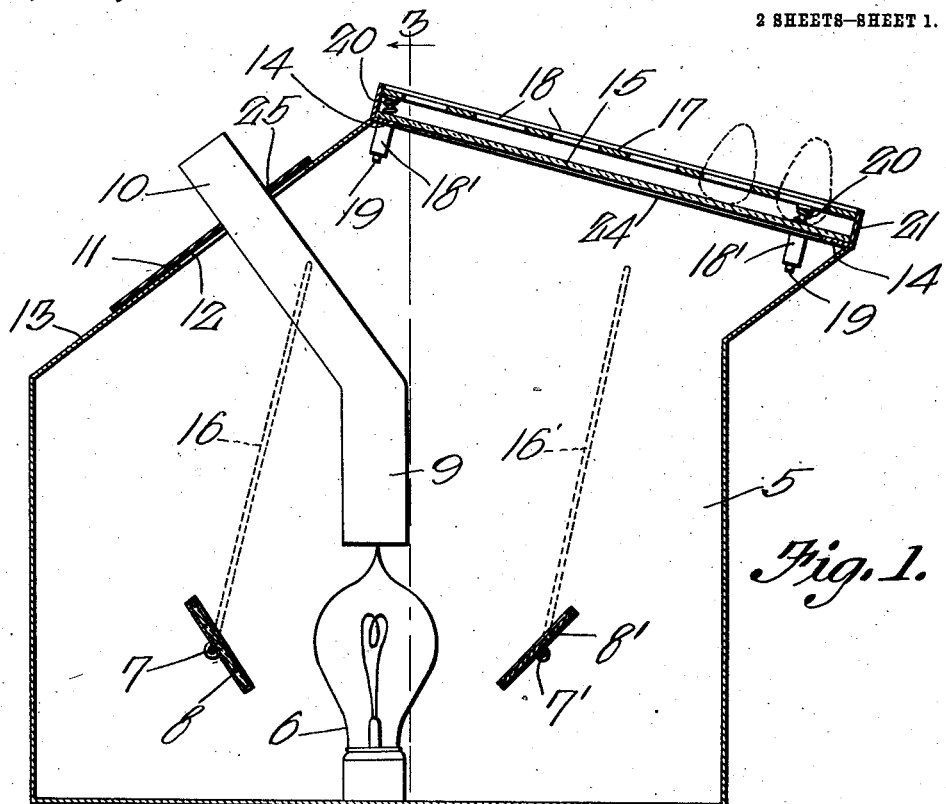

H. R. MORRIS.
EGG CANDLER.
APPLICATION FILED AUG. 10, 1911.

1,023,091.

Patented Apr. 9, 1912.

2 SHEETS—SHEET 1.

Witnesses

H. R. Morris  Inventor
by C. A. Snow & Co.
Attorneys

H. R. MORRIS.
EGG CANDLER.
APPLICATION FILED AUG. 10, 1911.

1,023,091.

Patented Apr. 9, 1912.

2 SHEETS—SHEET 2.

H. R. Morris
Inventor

Witnesses by C. A. Snow & Co.
Attorneys

UNITED STATES PATENT OFFICE.

HARRISON R. MORRIS, OF MAPLETON, KANSAS.

EGG-CANDLER.

1,023,091.  Specification of Letters Patent.  Patented Apr. 9, 1912.

Application filed August 10, 1911. Serial No. 643,422.

*To all whom it may concern:*

Be it known that I, HARRISON R. MORRIS, a citizen of the United States, residing at Mapleton, in the county of Bourbon and State of Kansas, have invented a new and useful Egg-Candler, of which the following is a specification.

This invention relates to egg candling machines or egg testers and is adapted particularly to be used in connection with the egg handler shown in my Patent No. 978,049, issued December 6, 1910.

The object of my invention is to provide an improved device of this character in which a plurality of eggs may be tested concurrently.

A further object is to provide a device of this character especially adapted for use in connection with the egg handler described in the above mentioned patent.

With the above and other objects in view this invention is embodied in the novel arrangement, construction and combination of parts as hereinafter described and as shown in the accompanying drawings, in which similar reference characters indicate similar parts, and in which—

Figure 2:
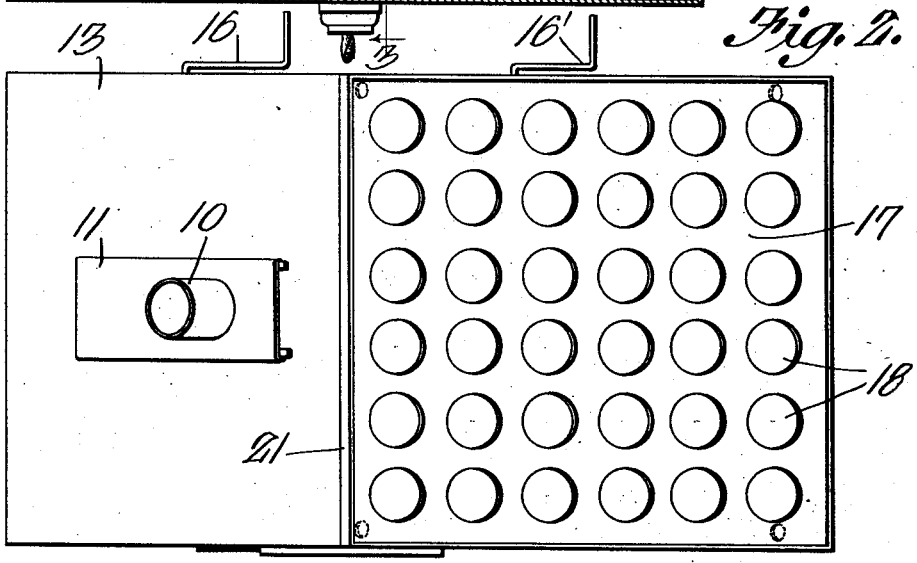
Figure 3:
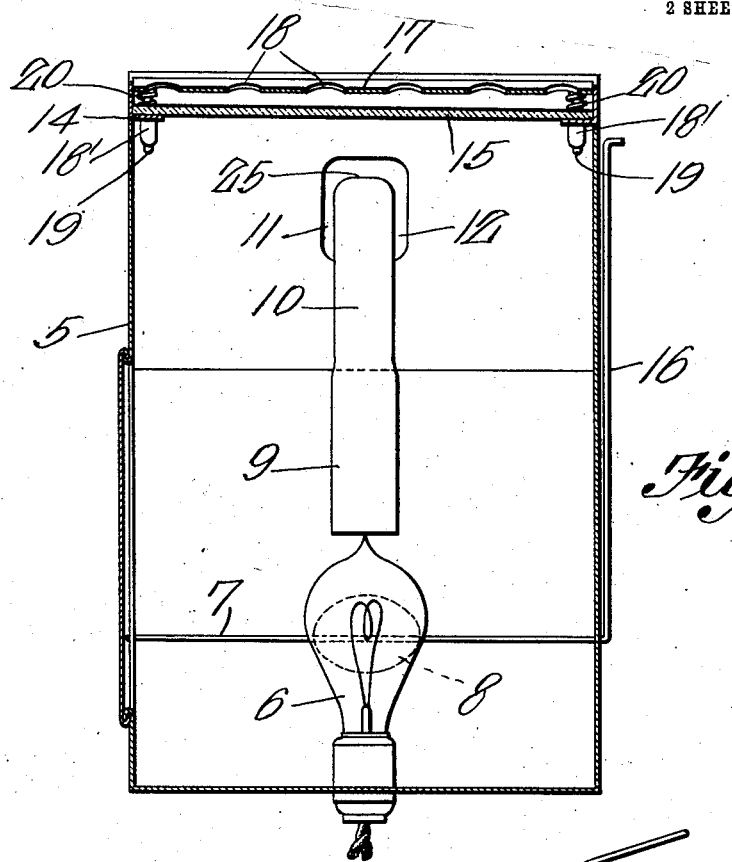
Figure 4:
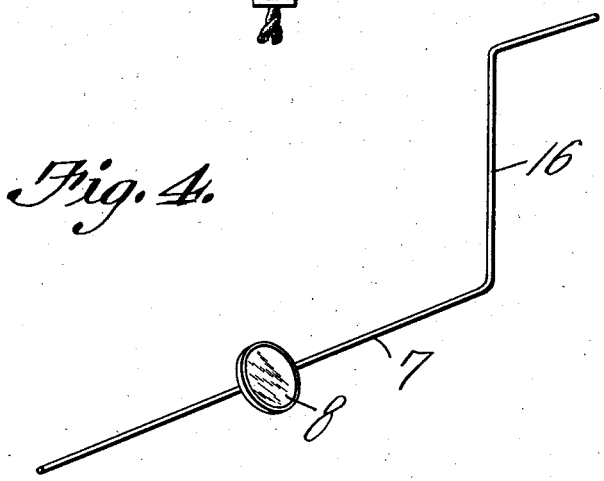

Figure 1 is a vertical section of the egg candler. Fig. 2 is a top view thereof. Fig. 3 is a section on the line 3—3 of Fig. 1. Fig. 4 is a perspective of one of the shafts and deflector secured thereto.

Referring specifically to the drawings, 5 designates a suitable casing constructed in any ordinary manner and of suitable material having the rear portion of the top thereof sloping rearwardly and having the front portion of the top sloping forwardly and having an opening formed therein forming the seat 14 around the edge of the said sloping portion of the top on which is seated a pane of glass or plate of other transparent material 15 to extend over the said opening and form a back stop for the eggs as hereinafter described. An upstanding flange 21 is arranged around the periphery of the seat or shoulder 14 and within the said flange is disposed a flat body 17 having a plurality of egg receiving apertures 18 therein. This body 17 is yieldably held in raised position about the transparent cover or back stop 24 by means of coiled springs 20 which have their lower ends fitting within depending pockets 18 at the corners of the shoulder 14, which springs 20 give an upward tension to pins 19 within the same and on which the body 17 is adapted to rest. The rear portion 13 of the top has an opening 12 therein and a cover 11 is slidably arranged over the said opening and has a hole 25 therethrough which slidably receives a pipe 10 which is arranged at approximate right angles with the portion 13 of the top of the casing, and this pipe 10 has the lower end 9 thereof bent to a vertical position. A suitable light 6, being shown as an electric light, is arranged in the bottom of the casing centrally thereof and by sliding the pipe 10 in the cover 11 and by sliding the said cover up or down the sloping portion 13, the lower end 9 of the said pipe can be brought immediately above the said light to conduct the heat out of the casing. It is also understood that various forms of illuminating arrangements can be used, such as candles, oil lamps, or the like, the pipe 10 also being adapted to conduct fumes and smoke formed by the lights out of the casing as will be understood. This means for adjusting the pipe forms a simple and convenient device for this purpose.

Laterally arranged shafts 7 and 7' respectively, are journaled in the sides of the casing and pass respectively in back and in front of the light 6 in the approximate plane of the center of illumination. On one end these shafts 7 and 7' have the hand levers 16 and 16' respectively, outside of the side of the casing, which hand levers project upwardly into the proximity of a tester proper. Suitable concaved reflectors 8 and 8' are mounted on the respective shafts 7 and 7' adjoining the light 6, whereby they may be swung by manipulating the hand levers 16 and 16'.

In operation, the eggs are inserted into the apertures 18 in the body 17, which body is preferably of suitable opaque material, and the eggs are adapted to fit snugly within the apertures to prevent the light from escaping around the same, the back stop 15 supporting the eggs in position, the front portion of the top of the casing being sloping to permit the rays of light to pass in the most direct direction through the transparent back stop 15 for the purpose of testing the eggs for decomposition, which form of testing eggs is in common use, and by swinging the hand levers 16 and 16', the respective reflectors may be tilted to focus the rays of light reflected therefrom on any row of the plurality of eggs. The volume of light striking the respective egg or eggs is therefore increased which increases the efficiency of the testing of bad eggs.

As stated above, this device is especially adapted for use in connection with the egg handler disclosed in the above mentioned patent. The egg handler disclosed in the said patent is adapted to grip a plurality of eggs simultaneously and thus when the body 17 is forced down, or upon an egg handler being set thereon is depressed, thus permitting the eggs to be conveniently removed simultaneously.

Although this device is especially adapted for use with the egg handler mentioned, it is to be understood that the same may be used with other egg handlers or devices.

It will be noted that the plate 15 in supporting the eggs and the body 17 being yieldable readily permits the egg handler to engage both the large and small egg held in the body 17. The body 17 being depressible permits the bulges of the eggs to be brought above the surface thereof whereby the smaller eggs as well as the larger eggs can be conveniently grasped by the egg handler.

What is claimed as new is:

1. In an egg tester, the combination of a casing having a sloping top with an opening therein, a cover slidable over the said opening up and down the said top and having a hole therein, a pipe slidable through the hole in the said cover and arranged at approximate right angles with the top of the casing and having the lower end thereof bent vertically, said casing being adapted to receive a light therein.

2. In an egg tester, the combination of a casing having means on the top thereof for holding a plurality of eggs for testing, a light within the casing, a shaft journaled within the casing, a hand lever at one end of same, and a reflector carried by the said shaft, whereby upon swinging the hand lever the rays of light reflected by the reflector can be focused on the various rows of eggs.

3. In an egg tester, the combination of a casing adapted to contain a light and having an opening in the top, a back stop for eggs over the said opening, and a yielding member disposed over the said stop and having egg receiving apertures therein.

4. In an egg tester, the combination of a casing adapted to contain a light therein and having an opening in the top thereof, a transparent back stop for eggs over the said opening, and a yielding member disposed over said back stop having egg receiving apertures therein.

In testimony that I claim the foregoing as my own, I have hereto affixed my signature in the presence of two witnesses.

HARRISON R. MORRIS.

Witnesses:
 Wm. W. Ball,
 Wm. Shannon, Jr.

---

Copies of this patent may be obtained for five cents each, by addressing the "Commissioner of Patents. Washington, D. C."